July 6, 1937.  O. H. HUNT  2,085,855
AUTOMATIC CONTROL SYSTEM PROVIDED WITH ANTICIPATORY MEANS
Filed Sept. 30, 1933    2 Sheets-Sheet 1
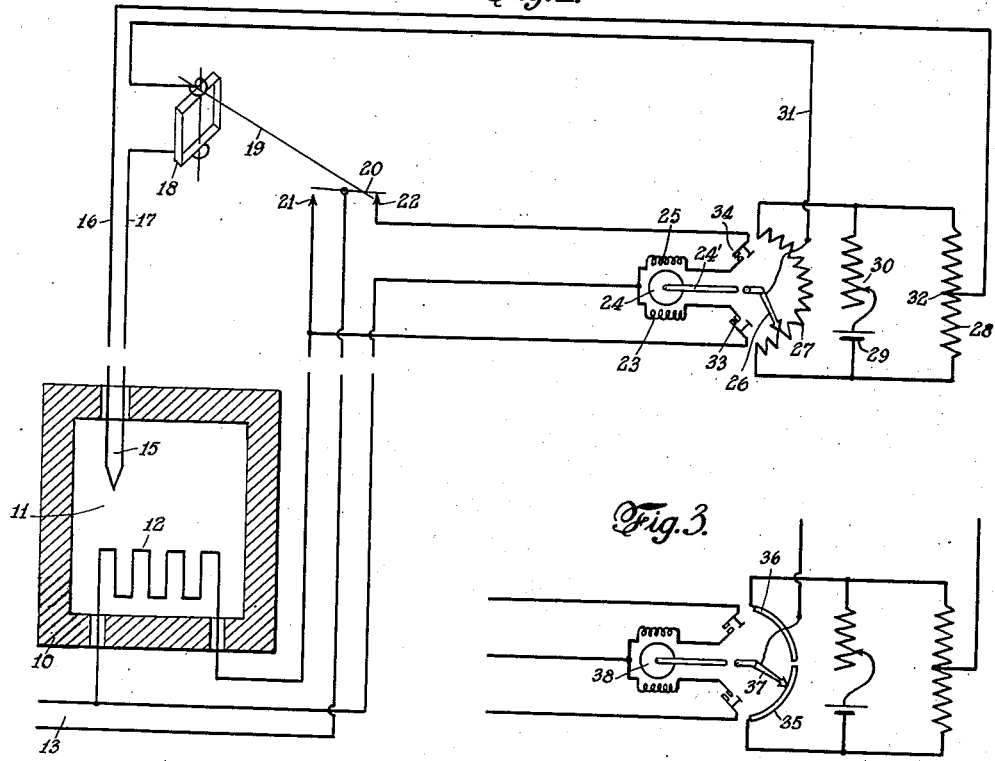
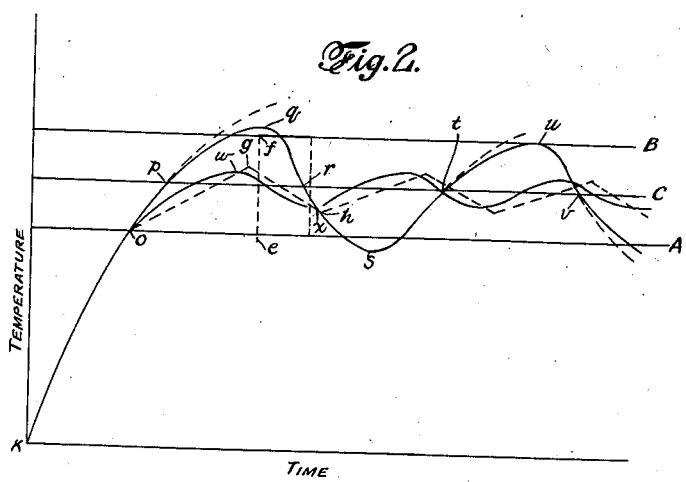
INVENTOR
Ozro H. Hunt
BY
ATTORNEY July 6, 1937.　　　　　　O. H. HUNT　　　　　　2,085,855
AUTOMATIC CONTROL SYSTEM PROVIDED WITH ANTICIPATORY MEANS
Filed Sept. 30, 1933　　　2 Sheets-Sheet 2
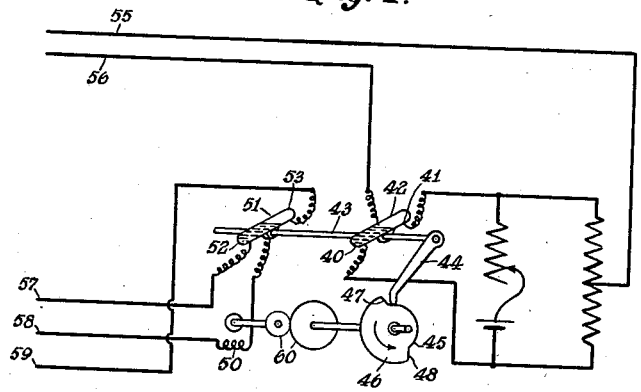
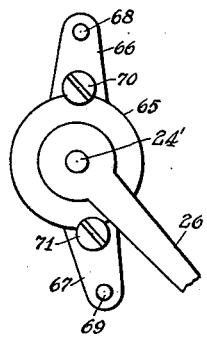
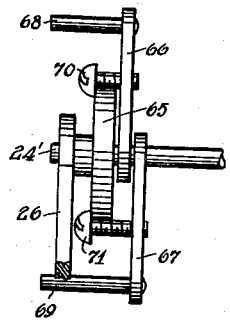
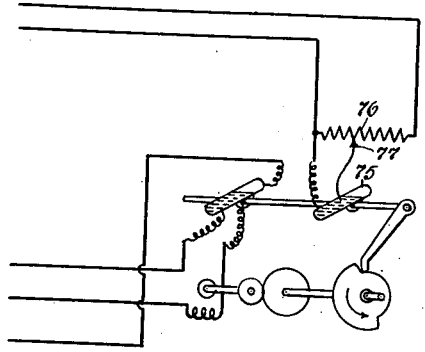
INVENTOR
Ozro H. Hunt
BY
ATTORNEY Patented July 6, 1937

2,085,855

UNITED STATES PATENT OFFICE 2,085,855

AUTOMATIC CONTROL SYSTEM PROVIDED WITH ANTICIPATORY MEANS

Ozro H. Hunt, Waterbury, Conn., assignor to The Bristol Company, Waterbury, Conn., a corporation of Connecticut Application September 30, 1933, Serial No. 691,638

10 Claims. (Cl. 236—69)

The invention relates to control systems and more particularly to systems of the nature in which measuring or control apparatus, such as an electric pyrometer, is utilized in controlling some physical condition which affects the thermocouple thereof. For example, in the case of an electric pyrometer, a detecting instrument such as a potentiometer, millivoltmeter, resistance device, etc., may be associated with the thermocouple and is provided with a deflecting member designed to control, through two or more operating circuits, a motor valve or valves, or like device, for regulating the supply of a suitable medium in maintaining the condition, as is well understood.

In the automatic control in this manner of temperatures, or similarly variable magnitudes, the detecting instrument has a customarily fixed, but adjustable, "control point", i. e., a point at which is set the control mechanism for the control circuit, so that as the regulated magnitude exceeds a value corresponding to the setting of the said element, agencies are brought into action tending to reduce the magnitude, and as the magnitude becomes less than the set value, other agencies are brought into action tending to cause it to increase. By the alternate action of these agencies in response to the deflecting member, as it passes above and below the control point, there is effected an average of the temperature or the like. Precise control, however, is not ordinarily possible because of the inertia of response of the physical structure associated with the condition under control, making it impossible to avoid a certain degree of overswing. An average rather than a constant value thus results.

It is an object of the present invention to provide in connection with a system of the aforesaid nature "anticipating" means whereby the control point is displaced through a small range and in a sense to meet the varying magnitude and thus effect control before the actual control point is reached and, particularly, to effect this operation in a manner to avoid "drift" of the control point.

A further object of the invention resides in the provision of means, having a linear operating characteristic, whereby the time element of the anticipating device may be adjusted to a predetermined performance and in accordance with the inertia of response of the control system. By thus meeting the measuring element first on one, and then on the other, side of the control point, and by effecting proper adjustment of the time element with respect to the inertia of response, it is possible to make use of the overswing as a means of carrying the controlled magnitude to substantial agreement with the set value of the control point.

In carrying out the invention, a temperature control system is set forth by way of example; and the same includes a suitable temperature measuring or control instrument and an element subject to the temperature fluctuations of the condition to be controlled and developing a potential corresponding to the temperature to which it is exposed, which serves for the control of a deflecting member of the measuring instrument. The said deflecting member, in turn, operates one or more control circuits actuating suitable means for varying the value of a resistance designed to change the value of the potential affecting the measuring instrument.

The nature of the invention, however, will best be understood when described in connection with the accompanying drawings, in which:

Fig. 1 is a diagrammatic view illustrating the novel control system with anticipatory means.

Fig. 2 is a graphical representation illustrating control under various conditions.

Fig. 3 is a diagrammatic view illustrating a modification in the resistor control mechanism and adapted to a sudden transition of the control point.

Fig. 4 is a diagrammatic view illustrating a further modification of the resistor control mechanism.

Figs. 5 and 6 are respectively a front elevation and a side elevation of mechanism for introducing backlash or effecting delayed action of the resistor control mechanism.

Fig. 7 is a diagrammatic view of a resistor control mechanism suited particularly to direct deflecting pyrometers.

Referring to the drawings, more particularly Fig. 1 thereof, 10 designates an electric furnace having the interior heating space 11 adapted to be heated, for example, by the resistance type heater 12 deriving energy, for example, from the power mains 13. A thermocouple 15 projects into the heating space 11 so as to be exposed to the temperature therein and forms part of the measuring and control circuit embodying the leads 16 and 17, the latter of which is shown as being directly connected to the one side of a sensitive moving coil 18 of the detecting instrument which comprises also a deflecting member 19 moving in accordance with the E. M. F. developed by the thermocouple 15 as a measure of the temperature in the heating space 11.

The control portion of the deflecting apparatus is diagrammatically represented by the movable contact bar 20 adapted to close circuits alternatively at contacts 21 and 22; and the instrument as a whole may take the form, for example, of that disclosed in U. S. Letters Patent #1,675,359. The deflecting member 19 is caused to act periodically on the said contacts, similarly to the arrangement set forth in the aforesaid patent, and effect control thereby of the temperature within the space 11 by intermittently applying power to the heating element 12 thereof. That is to say, the circuit to the heating coil 12 will be closed to energize said heating coil only when the movable contact bar 20 is caused to engage the contact 21.

Contact of the movable contact bar 20 with the contact 21 serves also to energize the one field 23 of a reversible electric motor 24, its other field 25 being energized only when the bar 20 engages the contact 22. This motor is adapted to drive, through its shaft 24′, a rheostat arm 26 in one direction or the other and in accordance with the energization of the respective fields 23 and 25, said arm being moved thereby over a resistor 27. The rate of introduction of the resistance will be predetermined by the driving speed of the motor which is readily adjustable, for example, through the usual speed train associated with said motor.

Resistor 27 constitutes one side of a bridge having a further resistor 28 located in its opposite side, with a source of unidirectional constant potential, such as the primary cell 29, connected between the two resistors; and an adjustable resistance 30 is preferably connected in circuit with the source of E. M. F. 29 for the purpose hereinafter set forth. A lead 31 connects the movable rheostat arm 26 to the other side of the moving coil 18; and the lead 16 is connected to the resistor 28, preferably at its midpoint 32.

The motor 24 may be of any well-known three-terminal type such as, for instance, a "Telechron" type CX motor whose two field coils 23 and 25 are adapted to act alternatively on the rotor of the motor to move the arm 26 in a direction depending on which of the two coils is energized. Limit switches 33 and 34 may be associated respectively with the field coils 23 and 25 to open the circuits of these coils and prevent further travel of the arm 26 as the extremes of the resistor are approached. It is to be understood that these limits are for protection only and do not form an essential part of the invention.

The connections of the said motor to the circuits controlled by the contact bar 20 are such that when the circuit is closed thereby at the "high" contact 22, the coil 25 is energized, operating the motor in a sense to introduce into the thermoelectric circuit an electromotive force from the cell 29 opposing that set up by the couple, and to increase this E. M. F. gradually but at a rate materially faster than that at which the E. M. F. developed by the thermocouple will decrease due to cooling of the furnace. In the same manner, when the circuit is closed at the "low" contact 21, motor 24, tends to vary the voltage introduced into the thermocouple circuit in such a manner as to add to that developed by the couple, thus simulating an abnormally rapid rise in temperature in the furnace.

There is thereby introduced into the circuit from the thermocouple 15, in series with the moving coil 18, an auxiliary E. M. F. derived from the cell 29 and whose value may be caused to vary from a maximum in one direction, through a zero value, to a maximum in the opposite direction. The overall magnitude of this auxiliary E. M. F., it will be understood may be regulated by the adjustable resistance 30.

The operation will be better understood by reference to Fig. 2 in which the temperatures are plotted as ordinates and time as abscissae. The control point or value at which it is desired to maintain the temperature is indicated by the line C; and the performance obtained with the conventional type of control system by the line o—p—q—r—s—t—u—v. Assuming a cold furnace, the control contact being at "low" contact 21, and power on the heating element 12, the temperature will tend to rise along a substantially logarithmic increment, as indicated by the line k—o—p, and its dotted extension above the line "C". As the line "C" is reached, the control instrument is actuated, and the contact 21 is opened, de-energizing the heater 12, and allowing the furnace to approach a state of thermal equilibrium. Owing to thermal inertia, the furnace will not at once begin to cool, but the temperature curve will gradually fall away from the original trend, and will reach a maximum value, as represented at q, after which cooling will set in, and the temperature will fall until it again intersects the control line "C" as at r, when the control instrument will again be actuated and the heater energized through the contact 21. The temperature will then follow a curve similar to that just described, but in the inverse sense, passing through a minimum value as at s, and coming up to the control point at t. Thus control is effected, and the temperature under control caused to follow the wavy line p—q—r—s—t—u—v.

With the anticipating device, it may again be assumed that the furnace is started up from a cold condition, and with the controller standing with its "low" contact 21 closed, the motor 24 will have run to its limit, as determined by the switch 34, and there will be introduced into the thermoelectric circuit from the bridge circuit an E. M. F. tending slightly to increase any temperature reading which may obtain on the pointer 19.

It will be seen that this "artificial" increase of temperature reading will be the exact equivalent of a lowering of the control value, so that in the diagram, the control value will be represented by the line "A", rather than "C" as before. As the temperature of the furnace rises along the original logarithmic line k—o—p, the new control value will be intersected at the point o, whereupon the instrument will act as before, to interrupt the power supply to the heating element 12, allowing the heating curve to fall off along the curved line o—w, which falls short of the line p—q—r by an amplitude substantially equivalent to the distance the line "A" lies below the line "C." Thus, by adjustment of the position of "A", as by the rheostat 30, the temperature may be caused, instead of crossing the control line (as o—p—q—r), to fall short of it, to barely cross it as shown at o—w—x in the diagram, or in some cases to become tangent to it at the peak value. In the meantime, consequent upon the closing of the contact 22 as contact 21 was opened, the motor 24 has become energized, causing the arm 26 to sweep slowly across the resistor 27, gradually decreasing the introduced voltage, which is the equivalent of raising the control point, as indicated by the inclined dotted line o—g in the diagram, tending to approach the value represented by the control line "B."

As the control point rises along the line o—g it is eventually intersected by the cooling curve of the furnace, as at point w, when the controller or deflecting instrument 18 is actuated, the contact 21 closed, and the heating element 12 energized. At the same time, the motor 24 is thrown into action in a sense to lower the control point, as along the straight dotted line approaching the point h.

The temperature curve, as before, gradually takes on an ascending characteristic, and intersects the inclined control line as at x, when the controller is again actuated and the cycle repeated as before. Thus, it will be seen that by the continual shifting back and forth of the control point, the temperature curve is caused to follow a line which approaches more closely to the ideal control value "C" than would be possible with the control point at a definite fixed value. It will be seen, moreover, that with the speeds of the motor in both directions equal, the tendency will be for the total energy added to the thermoelectric circuit to become equal to the total deducted from it, so that in the mean of a cycle there will be no tendency for the control point to "drift." Thus, when the slope of the lines o—g, g—h, etc., as determined by the rate of variation of the introduced potential, is adjusted to be symmetrical with relationship to the arcs o—w, w—x, etc., forming the control curve as determined by furnace characteristics, the positive and negative areas of the loops enclosed between the two series of lines will balance; and tendency of the system to "drift" will be eliminated.

Further inspection of the curves, Fig. 2, will disclose that since the magnitude of the introduced potential follows substantially a straight line law, as at o—g, g—h, etc., the desired performance of the controller is readily predetermined and secured through adjustment of the rate of variation of the potential resulting from the operation of the resistor.

While in the disclosure hereinbefore set forth, the control point has been represented as making a gradual transition between its extreme values "A" and "B", it is not essential, so long as the time interval is introduced, that the actual transition be other than instantaneous, for example, in Fig. 3 an alternative form of the bridge circuit is indicated in which the continuously variable resistor of the bridge indicated in Fig. 1 is replaced by contact sectors 35 and 36 along which sweeps the contact arm 37—all other portions of the bridge circuit remaining identical with those indicated in Fig. 1. With the modified arrangement, it will be noted that as the controller 18 is actuated, as at the point o, Fig. 2, said control point will not immediately begin to change but will remain fixed for a time as arm 37 sweeps along the sector 35. As the arm crosses to the other sector 36, the control point will instantly be changed from that represented by the line "A" to that represented by the line "B", the transition taking place as along the line e—f. As the line e—f crosses the temperature line, or as soon thereafter as the period of the controller permits, control is effected as in the previous examples, and the ascending characteristic introduced, while at the same time the motor 38 is reversed and the arms 37 driven thereby approaches the point of transition.

It will be apparent that in this case, if the controller were instantaneous in its performance, having its contact actuated immediately upon intersection of the temperature line and the control line, the arm 37 would not deviate perceptibly from its intermediate position, but would oscillate continuously between contact sectors 35 and 36, giving the equivalent of an infinitely fine control. Since, for practical reasons, considering the mechanical limitations of the equipment, such a control is seldom desirable, this embodiment of the invention lends itself particularly to the class of control instrument set forth in the hereinbefore mentioned patent, and wherein provision is made for actuating the contacting members only at predetermined time intervals.

In the event of its being desired to embody in the device a time element materially greater than that characterizing the control instrument, suitable expedients may be resorted to. For example, reference being had to Fig. 4 of the drawings, a bridge circuit substantially similar to that indicated in Fig. 3 is utilized, the two end contacts 40 and 41 of a double-throw mercury switch 42 replacing the contact sectors 35 and 36 of the previously described embodiment. Mercury switch 42 is mounted upon a horizontally disposed shaft 43, and is adapted to be thrown from one extreme position to the other by means of a follower arm 44 secured to the shaft and actuated by a cam having two sections 45 and 46 of distinctly different radii. Each of the cam surfaces occupies somewhat less than a semi-circumference and are separated by short sections 47 and 48 of gradual transition. When the arm 44 is, therefore, upon the cam surface 46 of greater radius, a circuit will be closed at one contact of the switch, for example, the contact 41; and with the arm upon the other surface 45 of the cam, another circuit will be closed through rocking of the shaft 43, as at the contact 40, and as is indicated in Fig. 4.

A motor, indicated at 50 and adapted to operate in one direction only, is arranged to rotate the cam having the surfaces 45, 46, 47 and 48 for actuating the mercury switch 42. A further mercury switch 51 having the contacts 52 and 53 is mounted upon shaft 43 to operate synchronously with the switch 42 and is connected in the motor circuit, as shown, to act as a limit switch for said motor. This limit switch, however, differs in its operation in the circuits from the operation of the limit switches 33 and 34 provided in connection with the motor 24 of the embodiment shown in Fig. 1, in that it forms an essential part of the latter embodiment of the invention, shown in Fig. 4.

With the thermocouple instrument leads 55, 56 and the motor leads 57, 58 and 59 connected identically with the connections set forth in the arrangement shown in Fig. 1 of the drawings, the operation of the device shown in Fig. 4 is as follows:

When a control circuit is closed, for example, to the leads 57, 58, for a "low" furnace state for heating thereof, the motor 50 will run to the position indicated in Fig. 4, rotating the cam in the direction indicated by the arrow. The motor will continue rotating until the said cam causes limit switch 51 to open the circuit between leads 57 and 58. At the same time, switch 42 will be actuated, introducing into the thermocouple leads 55—56 an E. M. F. from the bridge circuit and in a sense to oppose the prevailing E. M. F., with the equivalent effect of lowering the control point.

When the motor receives energy through the leads 58—59 upon the temperature attaining the depressed control point, the cam is again rotated in the same direction until it makes approximately one-half revolution with the follower arm 44 rising to the surface 46 of greater radius. This causes shaft 43 to rock, actuating switch 51 to open the motor circuit and also the switch 42 to close the circuit at its contact 41 and raising the control point.

It will be understood, therefore, that the performance is substantially identical with that disclosed in the embodiment illustrated in Fig. 3, except that the time interval is definite, being represented by the time required for the cam to make its half-revolution. Speed gears 60 included between the motor 50 and the cam may serve as a means for adjusting this time interval; or, the speed of the motor itself may be changed as is well understood.

For introducing the definite time interval in an arrangement such as is disclosed in Fig. 1 and which shall be independent of the intervals that characterize the control instrument thereof, a backlash device may be introduced between the motor 24 and the arm 26. Thus, reference being had to Figs. 5 and 6 of the drawings, the resistor arm 26 is mounted to be free to rotate upon the motor shaft 24', said shaft having affixed thereto a collar 65 provided with a circular edge. Rotatably mounted upon shaft 24' are two dogs 66 and 67, each carrying a pin 68 and 69, respectively, to engage and propel the arm 26. By means of screws 70 and 71 the respective arms may be clamped to the collar 65 in any desired position about the shaft 24', so that as the latter rotates in either direction, arm 26 will remain at rest until engaged by one or the other of said pins 68 and 69. There may thus be introduced into the movement of arm 26 an adjustable backlash or lost-motion element, whereby the said arm responds to the movement of a motor shaft 24' only after the lapse of a predetermined time interval following reversal of the rotation of the shaft.

Since the several methods which have been hereinbefore described act by introducing into the thermoelectric circuit an electromotive force derived from an external source, it follows that they are applicable to either the circuit of a direct-deflecting pyrometer movement, as illustrated in Fig. 1, or of a balancing movement, such as the potentiometer type, now in quite common use.

It is apparent, since no current flows in the detector circuit of a potentiometer at the time of performing measurement, that an external electromotive force must be applied to the system. In the direct-deflecting instrument, on the other hand, there flows at all times a current representative in its magnitude of the temperature of the thermocouple, so that substantially the same effect as that obtained by introduction of the external electromotive force may be produced by cutting in and out a resistance in the circuit.

This arrangement is indicated in Fig. 7 of the drawings, wherein the mercury switch 42 of the embodiment indicated in Fig. 4 of the drawings is replaced by a single throw mercury switch 75 and the bridge circuit by a simple resistor 76 tapped off by the adjustable contact 77 and adapted to be short-circuited by the switch 75.

I claim:

1. In a control system: an electrical detecting instrument having a deflecting member, and an element responsive to changes in a condition to be controlled and adapted to develop a corresponding E. M. F. for controlling the position of the deflecting member, a plurality of control circuits, a bridge circuit comprising a source of constant E. M. F., a fixed resistor connected across the same, a two-pole mercury switch connected across the source of E. M. F. for reversing its polarity, the said switch and resistor being connected respectively to the detecting instrument and the responsive element, an electrically operated cam to rock said switch and regulated by the control circuits, and an additional two-pole mercury switch operating simultaneously with the first-named switch to interrupt the control circuits after the polarity-reversing switch has been rocked to establish contact at one of its poles.

2. In a control system: an electrical detecting instrument having a deflecting member, and an element responsive to changes in a condition to be controlled and adapted to develop a corresponding E. M. F. for controlling the position of the deflecting member, a plurality of control circuits, a bridge circuit comprising a source of constant E. M. F., a fixed resistor connected across the same, a delayed-action resistor connected across the source of E. M. F., said resistors being connected respectively to the detecting instrument and the responsive element, and means to adjust said delayed action resistor and regulated by the control circuits.

3. In a control system: an electrical detecting instrument having a deflecting member, and an element directly sensitive to changes in a condition to be controlled and adapted to develop a corresponding electromotive force for controlling the position of the deflecting member; switching means actuated by the instrument for governing the condition; a plurality of control circuits subject to the deflecting member; and anticipatory means for affecting the deflecting member, and including potential-varying means in circuit with the detecting instrument and the sensitive element for introducing into said circuit a potential and repeatedly varying the same alternately above and below a zero value, said anticipatory means being regulated by the control circuits to augment temporarily the increment of E. M. F. due to the governing action, and means mechanically timing the potential-varying means in accordance with the inertia of response of the system to be controlled.

4. In a control system: an electrical detecting instrument having a deflecting member, and an element directly sensitive to change in a condition to be controlled and adapted to develop a corresponding electromotive force for controlling the position of the deflecting member, and a series circuit including said deflecting member and sensitive element; switching means actuated by the instrument for governing the condition; and anticipatory means for affecting the deflecting member and including a bridge circuit included in said series circuit between said instrument and said sensitive element for introducing into said circuit a potential and repeatedly varying the same alternately above and below a zero value, and timing means for mechanically and automatically adjusting the constants of the bridge circuit in accordance with the inertia of response of the system to be controlled, whereby the total E. M. F. in the series circuit is made alternately greater than and less than that developed by said sensitive element.

5. In a control system: an electroresponsive instrument having a deflecting member, and an element sensitive to changes in a condition to be controlled and adapted to maintain in said instrument and in itself a current representative of the magnitude of said condition, for controlling the position of said deflecting member; switching means actuated by the instrument for governing the condition; a plurality of control circuits subject to the deflecting member; an electrical circuit including said instrument and element and a bridge network, said network comprising a source of constant electromotive force and resistance elements connected to the same for introducing into said circuit a potential to augment temporarily the increment of E. M. F. due to the governing action and repeatedly varying said potential alternately above and below a zero value; and adjustable timing means for predetermining and regulating the value of one of said resistance elements, and controlled by said control circuits.

6. In a control system: measuring apparatus including an element sensitive to a condition to be controlled and adapted to set up a corresponding electromotive force, and an instrument electrically connected to said element and having a deflecting member definitely positioned in response to said electromotive force; switching means actuated by the instrument for governing the condition; a plurality of control circuits operated by the said instrument; and motor-actuated anticipatory means for the respective control circuits for introducing into the connection between the sensitive element and the measuring instrument an electromotive force and repeatedly varying the same alternately above and below a zero value to augment temporarily the increment of E. M. F. due to the governing action.

7. In a control system: measuring apparatus including an element sensitive to a condition to be controlled and adapted to set up a corresponding electromotive force, and an instrument electrically connected to said element and having a deflecting member definitely positioned in response to said electromotive force; switching means actuated by the instrument for governing the condition, a plurality of control circuits operated by the said instrument; and motor-actuated anticipatory means for the respective control circuits for introducing into the connection between the sensitive element and the measuring instrument an electromotive force and repeatedly varying the same alternately above and below a zero value to augment temporarily and gradually the increment of E. M. F. due to the governing action.

8. In a control system: an electrical detecting instrument having a deflecting member, and an element directly sensitive to changes in a condition to be controlled and adapted to develop a corresponding electromotive force for directly controlling the position of the deflecting member; switching means actuated by the instrument for governing the condition; and anticipatory means for affecting the deflecting member, and including potential-varying means in circuit with the detecting instrument and the sensitive element for introducing into said circuit a potential to augment temporarily the increment of E. M. F. due to the governing action and repeatedly varying the said potential alternately above and below a zero value.

9. In a control system: an electrical detecting instrument having a deflecting member, and an element responsive to changes in a condition to be controlled and adapted to develop a corresponding E. M. F. for controlling the position of the deflecting member, a plurality of control circuits, a bridge circuit comprising a source of constant E. M. F., a fixed resistor connected across the same, a switch connected across the source of E. M. F. for reversing its polarity, the said switch and resistor being connected respectively to the detecting instrument and the responsive element, an electrically operated cam to actuate said switch and regulated by the control circuits, and an additional switch operating simultaneously with the first-named switch to interrupt the control circuits after the polarity-reversing switch has been actuated to establish contact at one of its poles.

10. In a control system of the type including an electrical detecting instrument, an element directly responsive to a condition to be controlled and adapted to develop therefrom a corresponding E. M. F., the detecting instrument being electrically connected to said responsive element and having a deflecting member normally assuming a position representing a condition of torque equilibrium between said E. M. F. and an opposing magnitude whose variations represent those of said E. M. F., switching means actuated by the instrument for governing the condition, and a plurality of electrical control circuits commanded by the deflecting member: a source of E. M. F. independent of said opposing magnitude, and an anticipatory device for introducing temporarily into the connection between the sensitive element and the detecting instrument said independent source of E. M. F. to augment temporarily the increment of E. M. F. due to the governing action, said anticipatory means including a mechanically timed variable resistor member regulated by the plurality of control circuits.

OZRO H. HUNT.